United States Patent
Frankowski

(10) Patent No.: US 6,611,343 B1
(45) Date of Patent: Aug. 26, 2003

(54) METHOD AND DEVICE FOR 3D MEASUREMENT

(75) Inventor: Gottfried Frankowski, Berlin (DE)

(73) Assignee: GF Messtechnik GmbH, Tetlow (DE)

( * ) Notice: Subject to any disclaimer, the term of this patent is extended or adjusted under 35 U.S.C. 154(b) by 0 days.

(21) Appl. No.: 09/254,983

(22) PCT Filed: Aug. 29, 1997

(86) PCT No.: PCT/DE97/01948

§ 371 (c)(1),
(2), (4) Date: Aug. 9, 1999

(87) PCT Pub. No.: WO98/12501

PCT Pub. Date: Mar. 26, 1998

(30) Foreign Application Priority Data

Sep. 18, 1996 (DE) .......................... 196 39 999

(51) Int. Cl.⁷ ............................... G01B 11/30
(52) U.S. Cl. ......................................... 356/601
(58) Field of Search .............. 356/371, 372, 356/376, 374

(56) References Cited

U.S. PATENT DOCUMENTS

| | | | | |
|---|---|---|---|---|
| 5,260,953 A | | 11/1993 | Rowe ......................... | 372/20 |
| 5,289,491 A | | 2/1994 | Dixon ........................ | 372/92 |
| 5,289,493 A | | 2/1994 | Fink .......................... | 372/94 |
| 5,339,154 A | * | 8/1994 | Gassler et al. .............. | 356/376 |
| 5,357,537 A | | 10/1994 | Maker ......................... | 372/94 |
| 5,372,502 A | | 12/1994 | Massen et al. .............. | 433/215 |
| 5,592,246 A | * | 1/1997 | Kuhn et al. .................. | 351/212 |
| 5,615,003 A | * | 3/1997 | Hermary et al. ............. | 356/376 |
| 5,680,216 A | * | 10/1997 | Hierholzer et al. ......... | 356/376 |

FOREIGN PATENT DOCUMENTS

| | | | | |
|---|---|---|---|---|
| CA | 2163934 | 5/1996 | ............ | G01B/11/24 |
| DE | 4415834 | 11/1995 | | |
| DE | 19502459 | 8/1996 | | |
| EP | 0330429 | 8/1989 | | |
| EP | A 0452069 | 10/1991 | ............ | H01S/3/083 |
| EP | 0664470 | 7/1995 | | |
| GB | A 1214941 | 12/1970 | .............. | G02F/1/39 |
| JP | 07033799 | 9/1996 | | |

OTHER PUBLICATIONS

Boysel: "A 1920*1080 element deformable mirror device for high definition displays," IEEE Transactions on Electron Devices., Dec. 1991, vol. 38, No. 12, New York, USA, p. 2715 XP002051088.

Do–Dyeong Ko et al.: "Accurate frequency–tuning mechanism from a wedge prism in a single–mode tunabe laser," Applied Optics, Feb. 20, 1995, vol. 34, No. 6, pp. 983–987.

* cited by examiner

*Primary Examiner*—Zandrau Smith
(74) *Attorney, Agent, or Firm*—Norris McLaughlin & Marcus, P.A.

(57) ABSTRACT

This invention describes a procedure and a device for contact-free, opto-electronic 3D-measuring of objects. Especially partially automated and automated manufacturing processes with constantly decreasing cycle times and higher precision requirements demand modern measuring procedures and devices, monitoring the quality criteria required and controlling manufacturing processes. A procedure and device is introduced to extend the possibilities for application of computerized 3D-measuring technology and for online-integration into the production process. Within a single recording cycle arbitrary line patterns suitable for 3D-measuring technology and defined intensity structures are projected via micromirror projector for object coding.

2 Claims, 3 Drawing Sheets

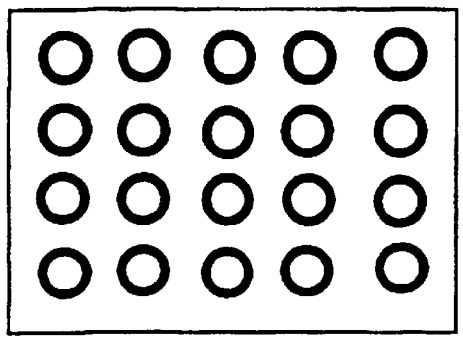
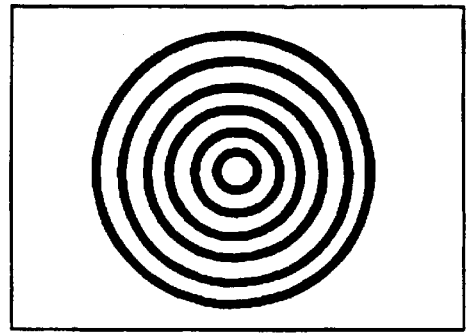
Fig. 2a            Fig. 2b
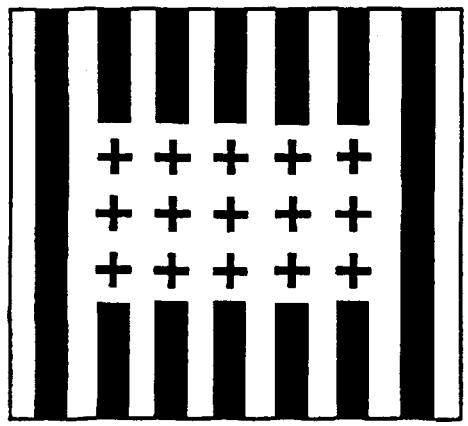
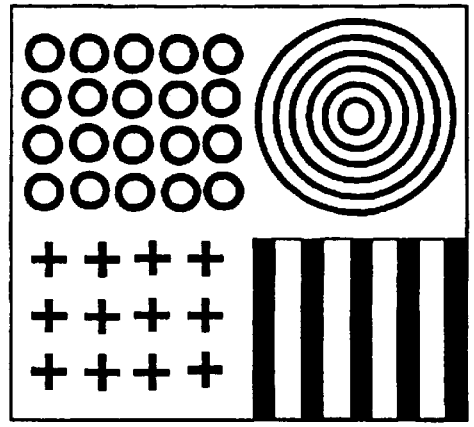
Fig. 4            Fig. 5

METHOD AND DEVICE FOR 3D MEASUREMENT

BACKGROUND OF THE INVENTION

The invention describes a process and a device for contact-free, opto-electronic 3D-measuring of objects. Intensity structures (graycodes) are projected onto the object to be coded, followed by a computerized evaluation via opto-electronic signal analysis, utilizing the intensity structure deflections caused by the object volume structure, determining surface condition, configuration (shape), and/or dimensions of the object.

The line-projection procedure has been implemented in optical 3D-measuring technology for several years. It can be distinguished between procedures using a projection system with fixed line distance and projection systems with variable line distance.

The measuring results and information attainable with the line-projection procedure, in connection with the optical and microscopic systems used, largely depend on the quality of the projected lines. For information on the 3D-profile of an object line-projection, procedures with variable line distance are advantagous, since signal-recording systems (CCD-cameras, Framegrabber, computer) enable graycoding of the surface. These line-projection procedures are also called "graycode-procedures".

Conventional graycode-procedures mostly use LCD-chips to create projection lines (gray codes), enabling the projection of line-shaped patterns through computer control of corresponding horizontal and/or vertical of lines and/or columns of the LCD-chip in connection with suitable lighting.

It is also common to generate graycodes using differing structures fixed onto a carrier, such as a glass plate, projecting them onto the object with a suitable optical system.

The disadvantages of the two techniques mentioned for generating graycode structures is that the creation of projection lines either depends on the line or the column structure of the LCD-chip, or that the projection pattern is permanently stored on the carrier material, thus not being movable.

Modern optical 3D-measuring technologies, mostly based on simultaneous and/or separate use of the active triangulation procedure (line projection) and on the passive triangulation procedure (photogrammetry), demand fast and easily variable line projection, which can be quickly adapted to specific geometric 3D-profile conditions and the surface condition of the object to be measured. This, however, is not possible with the known line projection procedures.

Further, LCD-line projections have the great disadvantage that the graycode line contrast generated is very minimal, making it impossible to use this type of line projection for numerous technical applications, or restricting its use.

For numerous technical measuring applications it is necessary to generate not only amplitudally modulated lines (black/white structures, white structures) with rectangular intensity structures, but also phase-modulated lines (gray-scale structures) with a defined sinusoidal intensity structure to be projected onto the object during the same measuring cycle. Using the conventional LCD-line projection this is either not possible at all, or only possible using additional optical imaging systems, respectively.

A further disadvantage when using additional optical imaging systems is that all gray-code sequences are modulated sinusoidal or that the rectangular sequences are skewed, respectively. This again has negative consequences for the measuring application, since rectangular as well as sinusoidal graycodes have to be projected onto the object to achieve a high measuring resolution.

For the creation of line projections for 3D-measuring grid plates with a large number of differing line patterns with very low resolution of 0,5 μm are also used. The respective lines are projected onto the object by the grid plate being moved in the beam channel of the projector, enabling the creation of rectangular as well as sinusoidal line intensities and a high line contrast. Aside from the additional equipment needed for movement of the grid plate and possible sources for failure and mistakes through use of mechanical adjustment elements, this solution for the generation of projection and line intensities has a relatively high cycle time. Therefore, it can not necessarily be implemented on automated and partially automated manufacturing lines.

SUMMARY OF THE INVENTION

Thus, this invention is based on the requirement to record arbitrarily defined intensity structures (line codes) in one single recording cycle, usable for 3D-measuring technology and projectable onto the object to be measured.

With the invention presented the disadvantages of the previously known and technically applied procedure for creation of line projections are completely eliminated.

Through creation and projection of the line intensities with a micromirror projector, where a large number of individually computer controlled micromirror sections are arranged on a carrier, the desired intensity structures can be created in strip and line patterns commonly used in 3D-measuring technology, but also in sinusoidal modulation within an extremely short time frame within the recording cycle.

Especially for photogrammetry application it is possible to create geometric structures adapted to the 3D-profile of the object, such as circles, dots, cross shapes, ellipses, rectangles, and others. Their interference with the object geometry ensures a highly precise computerized recording of the 3D-profile of the object, the intensity structures created with this invention having a high contrast, resulting in a definite increase in measuring precision, performance, and information attainable with the 3D-measuring technology.

Just as known procedures generate intensity structures via overhead projector, corresponding to a laser-speckle-pattern or a statistical-noise-pattern, the solution presented as part of this invention also makes it possible to create and project such intensity structures.

Another application of the invention in optical 3D-measuring is provided by the projection of line patterns, inversed to the 3D-shape of an object. These inverse projection patterns are simply attained by first creating and storing the recorded 3D-shape of an intensity pattern adapted to the object geometry. If this projection pattern, containing the coded object shape, is then transferred to the micromirror projector via measuring and control computer and projected onto the object, the deformation of the projection pattern takes place conformant to the shape of the object. The recording camera stores the so-called inverse projection pattern, creating a base for the technical evaluation that follows. The cycle times for the 3D-measuring process can also be shortened considerably.

If an inverse projection pattern is created, for example using parallel line projection, it means that bent lines, adapted to the object shape are projected, and straight lines are indentified, due to the shape of the recording camera lens. Through use of the corresponding mathematical evaluation algorithms it is then possible to realize fast online-inspection of build part surfaces (e.g. in manufacturing), where only the deflection between the lines recorded by the camera and the ideal shape needs to be identified.

Another application of an inverse intensity pattern, created according to this invention, is to first record and register the reflection behavior of the object surface using a projection pattern. The intensity structure of the reflective behavior is then inverted via measuring and control computer and projected onto the object, thus lighting the strongly reflective surface areas with darker and the less reflective areas with lighter intensity structures. The measuring signals attained in this manner are also transferred for computerized evaluation. With this procedure there are also considerable savings in cycle times for 3D-measurement processing.

In summary the solutions of this invention for the opto-electronic 3D-measuring technology, especially with gray-code line projection and photogrammetry, achieve considerable extensions and improvements of the technical possibilities of previously known procedures, technically as well as methodically. The method suggested is also suitable for the design of a new generation of line projectors, to replace the projection systems initially described and for the configuration of complete 3D-measuring machines for application in manufacturing areas and for internal measuring.

BRIEF DESCRIPTION OF THE DRAWINGS

The invention will be explained using the following practical examples. The corresponding figures show:

FIGS. 2a and 2b: Intensity structures with circular insensity pattern

FIGS. 4 and 5: An intensity structure with different intensity patterns

DESCRIPTION OF THE PREFERRED EMBODIMENT

The intensity structures shown as an example in FIGS. 1a to 5 are created using micromirrors, arranged in the beam channel of a light source for imaging of intensity structures onto an object, implemented according to this invention. To create and project the intensity structures of different intensity patterns onto the object, the projector micromirrors are computer controlled per group and/or individually, and their position in reference to the light source is adjustable.

Figure 1A:
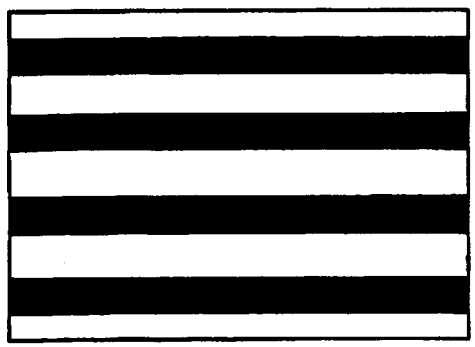
FIGS. 1a–1c: Intensity structures with rectangular intensity pattern
Figure 1B:
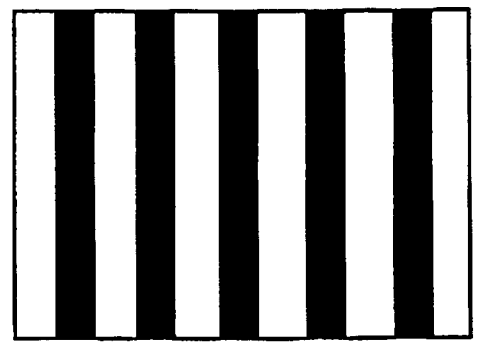

FIGS. 1a and 1b show rectangular intensity patterns horizontally or vertically aligned, as commonly known in current technology, for example being implemented successfully for the determination of the body shape or the surface quality of an object. With the help of the solutions of this invention several intensity structures of differently wide, rectangular, sinusoidal, or similar intensity patterns, and varying distances between the adjacent lines can be created and recorded with a camera for technical evaluation. This allows for greater precision and more information about the measuring result achieved.

Figure 1C:

As shown in FIG. 1c, intensity structures with a slanted intensity pattern in reference to the vertical and horizontal axis can be created during the same measuring cycle.

As shown in FIGS. 2a and 2b, circular intensity structures can be created with a single circular pattern via micro-mirror projectors, or can be projected into an object in a concentric pattern. The circular structures created have an extremely high contouring sharpness and their width can be varied arbitrarily. Circular intensity structures of this kind could not be created with devices and processes for 3D-measuring previously known, and are, for example, advantageous for measuring surface shapes or recesses on work pieces or any arbitrary objects.

Figure 3:
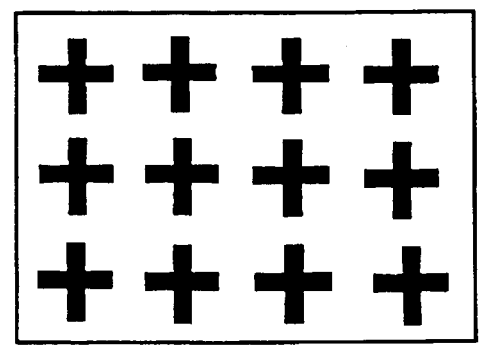
FIG. 3: An intensity structure with cross-shaped intensity pattern
Figure 6:
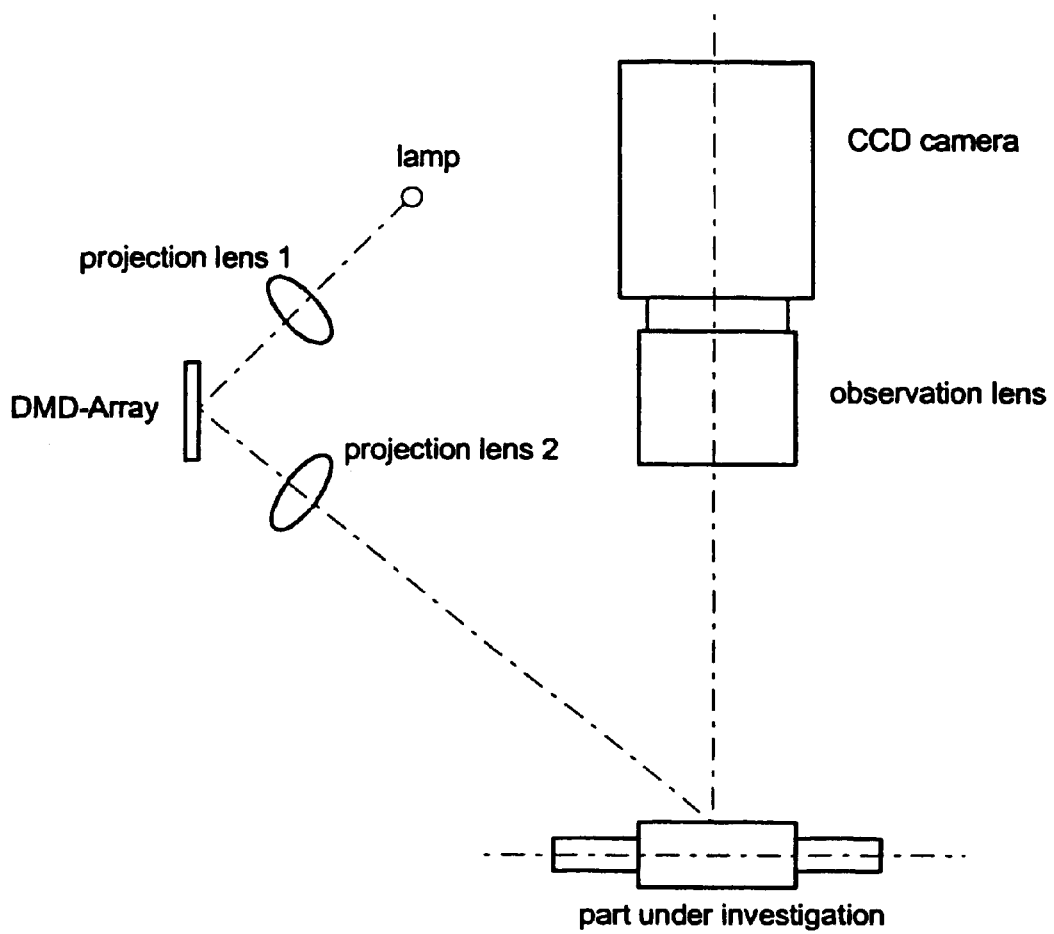
FIG. 6: Device for contact-free, opto-electronic 3D-measurement.

Another possibility for the creation of an intensity structure with a cross-shaped intensity pattern is shown in FIG. 3, where the number of patterns and their bodily structure is arbitrarily variable.

The invention described makes it possible for the first time to create in one single structure image, intensity structures with differing configuration and alignment of the intensity patterns, analog to an image-in-image function, and to project them onto an object. The differing procedures shown in FIGS. 4 and 5 especially make it possible to determine and record measurements of complicated body shapes and individual surface areas of an object.

What is claimed is:

1. A method for contact-free, opto-electronic 3D-measuring of an object having a three-dimensional structural shape, the method comprising of the steps of recording an intensity pattern of the structural shape of the object and storing the structural shape in coded form in memory;

feeding the stored structural shape to a micro-mirror projector via a measuring and control computer;

projecting the structural shape with the projector onto the object and creating a deformed inverse projection pattern corresponding to the shape of the object;

recording the deformed inverse projection pattern with a camera; and evaluating with a computer-supported opto-electronical evaluation protocol the created deflected inverse projection pattern corresponding to the shape of the object.

2. A device for contact-free, opto-electronic 3D-measurement of an object having a three-dimensional structural shape, comprising means for recording an intensity pattern of the structural shape of the object and storing the structural shape in coded form in memory;

means for feeding the stored structural shape to a micro-mirror projector via a measuring and control computer;

means for projecting the structural shape with the projector onto the object and creating a deformed inverse projection pattern corresponding to the shape of the object;

means for recording the deformed inverse projection pattern with a camera; and means for evaluating with a computer-supported opto-electronical evaluation protocol the created deflected inverse projection pattern corresponding to the shape of the object.

* * * * *